United States Patent
Wilson

(10) Patent No.: US 12,549,527 B2
(45) Date of Patent: Feb. 10, 2026

(54) MULTI-FACTOR AUTHENTICATION OF CLOUD-MANAGED SERVICES

(71) Applicant: NVIDIA CORPORATION, Santa Clara, CA (US)

(72) Inventor: Scott Wilson, Golden, CO (US)

(73) Assignee: Nvidia Corporation, Santa Clara, CA (US)

( * ) Notice: Subject to any disclaimer, the term of this patent is extended or adjusted under 35 U.S.C. 154(b) by 318 days.

(21) Appl. No.: 17/802,909

(22) PCT Filed: Feb. 26, 2021

(86) PCT No.: PCT/US2021/020018
§ 371 (c)(1),
(2) Date: Aug. 26, 2022

(87) PCT Pub. No.: WO2021/174077
PCT Pub. Date: Sep. 2, 2021

(65) Prior Publication Data
US 2023/0123159 A1    Apr. 20, 2023

Related U.S. Application Data

(60) Provisional application No. 62/983,293, filed on Feb. 28, 2020.

(51) Int. Cl.
*H04L 9/40* (2022.01)
(52) U.S. Cl.
CPC ........ *H04L 63/0442* (2013.01); *H04L 63/067* (2013.01); *H04L 63/123* (2013.01); *H04L 2463/082* (2013.01)

(58) Field of Classification Search
CPC . H04L 63/0442; H04L 63/067; H04L 63/123; H04L 2463/082; H04L 63/0884;
(Continued)

(56) References Cited

U.S. PATENT DOCUMENTS 10,402,090 B1 * 9/2019 Tsaur ................. G06F 3/067
11,374,903 B1 * 6/2022 Li ..................... H04L 63/0227
(Continued)

FOREIGN PATENT DOCUMENTS

CA    3065058 A1 * 6/2020 ........... G06F 21/602
CN    113806778 A  * 12/2021
(Continued)

*Primary Examiner* — Shahriar Zarrineh
(74) *Attorney, Agent, or Firm* — Hogan Lovells US LLP

(57) ABSTRACT

A cloud management system (180) only instructs a storage platform (100) in a private domain to implement an operation that reveals, modifies, or destroys data if an administrator (163) both provides valid credentials and is able to direct a services processing unit or SPU (120) in the private domain to send a message with valid contents and signature. An SPU (120) only performs operations that reveal, modify, or destroy data if signed instructions from the cloud management system (180) have originated or been relayed through a component (120) in the private domain. An attacker with access to the cloud management system (180) that does not also have access to a component (120) in the private domain is prevented from tampering with the storage platform (100).

20 Claims, 2 Drawing Sheets

(58) Field of Classification Search
CPC ... H04L 9/3228; H04L 9/3247; H04L 63/101; H04L 63/126; H04L 9/0894; G06F 21/34; G06F 21/6218

See application file for complete search history.

(56) References Cited

U.S. PATENT DOCUMENTS

| | | | | |
|---|---|---|---|---|
| 2009/0228525 | A1* | 9/2009 | Fridrich | G06Q 10/10 |
| 2009/0276623 | A1* | 11/2009 | Jevans | G06F 21/6209 |
| | | | | 713/155 |
| 2013/0046976 | A1* | 2/2013 | Rosati | H04W 12/03 |
| | | | | 713/168 |
| 2013/0132504 | A1* | 5/2013 | Kohli | H04L 65/752 |
| | | | | 709/213 |
| 2014/0009366 | A1* | 1/2014 | Chang | G09G 3/2092 |
| | | | | 345/1.1 |
| 2014/0181948 | A1 | 6/2014 | Mazur et al. | |
| 2015/0163206 | A1* | 6/2015 | McCarthy | G06F 21/6227 |
| | | | | 726/4 |
| 2015/0339401 | A1* | 11/2015 | Baldwin | G06F 40/186 |
| | | | | 707/769 |
| 2016/0359684 | A1* | 12/2016 | Rizqi | H04L 67/289 |
| 2017/0005944 | A1* | 1/2017 | Agrawal | H04L 43/0876 |
| 2018/0026984 | A1* | 1/2018 | Maker | H04L 63/102 |
| | | | | 726/4 |
| 2018/0063096 | A1* | 3/2018 | Rogson | H04L 63/105 |
| 2019/0310791 | A1* | 10/2019 | Kasturi | G06F 21/577 |
| 2019/0327223 | A1 | 10/2019 | Kumar et al. | |
| 2019/0377886 | A1 | 12/2019 | Roy | |
| 2020/0145499 | A1* | 5/2020 | Kaplan | G06F 16/9538 |
| 2020/0274778 | A1* | 8/2020 | Lecuyer | H04L 49/3009 |
| 2021/0165759 | A1* | 6/2021 | Bar-Nissan | G06F 16/119 |

FOREIGN PATENT DOCUMENTS

| | | | | |
|---|---|---|---|---|
| JP | 2013137595 A | * | 7/2013 | |
| WO | WO-2016191639 A1 | * | 12/2016 | G06F 11/0709 |

\* cited by examiner

MULTI-FACTOR AUTHENTICATION OF CLOUD-MANAGED SERVICES

BACKGROUND

Current enterprise class storage systems may provide data or storage services to many users or clients at an enterprise such as a government agency, a corporation or other business entity. Enterprise storage systems commonly provide a repository for data and provide common data sharing, management, and protection functions for many computer systems employed by an enterprise. Cloud-based management of storage systems may allow a remote expert such as a system-wide manager to manage the storage system. Cloud-managed services or services receiving instructions from a cloud service, however, are vulnerable to being compromised by attackers, so that security systems and methods are needed.

BRIEF DESCRIPTION OF THE DRAWINGS

The drawings illustrate examples for the purpose of explanation and are not of the invention itself. Use of the same reference symbols in different figures indicates similar or identical items.

DETAILED DESCRIPTION

Figure 1:
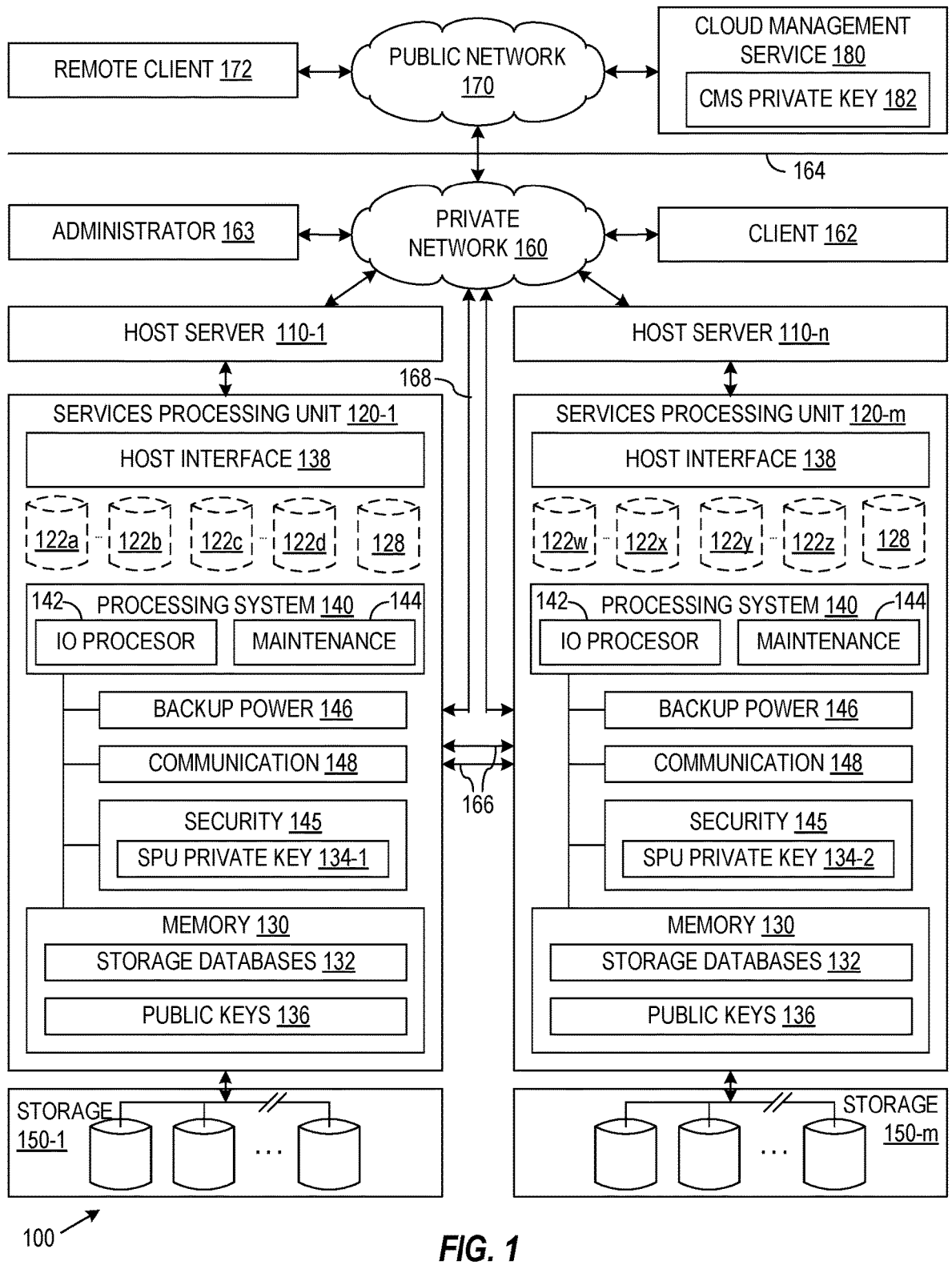
FIG. 1 is a block diagram illustrating a storage platform in accordance with one example of the present disclosure including a cloud management service.

In accordance with an aspect of the present disclosure, a storage platform that is configurable or accessible through the cloud only executes instructions that reveal, modify, or destroy data in a storage platform if the instructions have been relayed through a component in a private domain in which the storage platform resides. An attacker with access to the cloud even with stolen credentials but no access to a component in the private domain, cannot compromise the data in the storage platform.

An enterprise class of storage platform in accordance with one implementation of the present disclosure employs a data plane including physical components that reside in the private domain of the enterprise and a control plane including a management system that operates in and accesses the data plane through the cloud, i.e., the public Internet. The physical components store data that only properly authenticated and authorized clients within the private domain should be able access, modify, or destroy. Authentication of a cloud-based management system may be ensured through multi-factor authentication where a first factor is administrator credentials, such as a username and password. A second authentication factor is proof of access to a physical component in the private domain. As the physical components reside on a network that is inaccessible from outside the private domain, an attacker that has compromised an administrator's credentials possesses only one factor of the two factors needed for authentication.

Within the customer's private domain, data may be stored and managed with a combination of physical and software components sometimes referred to herein as services processing units (SPUs). Depending on its configuration, a storage platform may employ one or more SPUs, and each SPU may be assigned a unique private key with which the SPU can sign messages. In one specific implementation, the private key of an SPU resides in specialized hardware that prevents the key from being read, copied, or used by anything other than the SPU when signing messages. A public key associated with the private key of the SPU can be distributed and used by others to verify the signature of the SPU.

A cloud management service (CMS) may also have a unique private key with which the CMS can sign messages, and a public key may be associated with the private key of the CMS. In accordance with an aspect of the current disclosure, the CMS may access, modify, or destroy data with the cooperation of one or more SPUs inside the private domain. Each of the components has and uses the public keys of the other cooperating components to verify or authenticate signed messages.

To execute a storage management operation, an administrator may use a browser or other agent to log into the CMS. The browser or agent, which may be in a private domain, also opens a connection to one of the SPUs in the private domain that may be involved in performing the operations. To establish proof of access to the SPU, the administrator must be able to send a message that is signed by the SPU, e.g., originates from the SPU or is relayed through the SPU, to the CMS. To execute the operation, the SPUs involved receive signed instructions from the CMS either directly or indirectly and a signed message from one of the SPUs either directly or indirectly. Both signed messages provide factors to assure the SPU that the instructions are authentic.

FIG. 1 is a block diagram including a storage platform 100 in accordance with one example of the present disclosure. Storage platform 100 employs hardware including one or more host servers 110-1 to 110-n, which are generically referred to herein as host server(s) 110. Each host server 110 may be a conventional computer or other computing system including a central processing unit (CPU), memory, and interfaces for connections to internal or external devices. One or more SPUs 120-1 to 120-m, which are generically referred to herein as SPU(s) 120, are installed in host servers 110. In general, storage platform 100 may include one or more host servers 110, with each server 110 hosting one or more SPUs 120. A minimum configuration may include a single host server 110 in which one or more SPUs 120 resides, but more generally, a limitless number of different configurations are possible containing any number of host servers 110 and any number of SPUs 120.

Each SPU 120 may provide storage services to the host servers 110 and clients 162 or 172 via virtual volumes or logical unit numbers (LUNs) 122. FIG. 1 particularly shows SPU 120-1 provides storage services relating to a set of virtual volumes 122a to 122b and 122c to 122d, and shows SPU 120-m provides storage services relating to virtual volumes 122w to 122x and 122y to 122z. Each SPU 120 may be installed and fully resident in the chassis of its associated host server 110. Each SPU 120 may, for example, be implemented with a card, e.g., a PCI-e card, or printed circuit board with a connector or contacts that plug into a slot in a standard peripheral interface, e.g., a PCI bus in host server 110. Each SPU 120 may further or alternatively be or include a device (e.g., a circuit board, multiple boards, a SoC, or an ASIC). FIG. 1 shows an example of the present disclosure in which each SPU 120 includes a host interface 138 that is adapted or configured for connection to a host server 110. Host interfaces 138 are normally under the host's power, control and/or enumerations, but other core functions of SPUs 120, e.g., memory 130, processing system 140, and communication module 148, may be isolated from host servers 110 and connected to a backup power unit 146 that provides backup power to continue at least some operations of the SPU 120 regardless of state of its host 110.

Each SPU 120 includes memory 130 and a processing system 140 that may be part of the isolated core of the SPU 120 and that are configured and used to provide the IO services of the SPU 120. Processing system 140 may particularly include one or more processors to execute software or firmware to implement an IO processor 142 and a maintenance module 144. IO processor 142 may be used to process I/O requests such as reads and writes to primary volumes 122 owed by the SPU 120. A dedicated security chip 145 in the SPU 120 can generate and store one or more private keys 134 that are unique to the SPU, and can sign messages using private keys 134. The private keys 134 are only readable by security chip 145 in the SPU 120 for signing and never leave security chip 145. Memory 130 stores public keys 136, which may include public keys associated with the private keys 134 of other SPUs 120 in the storage platform and a public key for a cloud management system (CMS) 180.

Multiple SPUs 120, e.g., SPU 120-1 to 120-m in FIG. 1, may be connected together using high speed data links 166, e.g., one or more parallel 25 GB/s Ethernet links, to form a data network for a pod of SPUs 120. Data links 166 may particularly form a high speed data network that directly connects the SPUs 120 in a pod and that is independent of a private network 160 connecting host servers 110, clients 162, and an administrator 163.

Each SPU 120 may further employ a link 168 to connect to the local, private network 160 and through local network 160 and a firewall 164 connect to a public or wide area network 170, e.g., the Internet. In some implementations of storage platform 100, client stations 162 and administrator 163 may communicate through a host 110 or through a link 168 to request storage services from an SPU 120. Each client station 162 or administrator 163 may employ a computer including a processor, memory, and software or firmware for executing a user interface adapted to authenticate the client station 162 or administrator 163 and communicate over local network 160. Client stations 162 in general may be storage clients that require storage services that storage platform 100 provides. Administrator 163 may be a storage client or alternatively implemented on a host server 110 for local management for the storage platform. FIG. 1 further shows that local network 160 may provide a connection through firewall 164 to network 170, e.g., the Internet, so that SPUs 120 may be remotely accessed, for example, by cloud management service 180, which is described further below. Additionally, some clients 172, which may also be storage clients, may connect through public network 170 to receive storage services from storage platform 100.

Cloud management service 180 may include a computer or server that is remotely located, e.g., to reduce the burden of storage management on an enterprise or offload the burden of storage management to experts. Cloud management service 180 may be used to manage SPUs 120, e.g., to configure SPUs 120, monitor performance of storage platform 100, or provide analysis services. In particular, cloud management service 180 may configure each SPU 120 to create or delete virtual volumes 122 that the SPU 120 owns or populate the content of volumes, e.g., boot volumes. In addition to configuring volumes 122 that are available of storage services, management infrastructure 180 can be used to create or update boot volumes 128 for hosts 110. In accordance with an aspect of the current disclosure, instructions from cloud management service 180 must be authenticated before any action is locally taken. CMS 180 has public-key cryptography capabilities and a private key 182, so that CMS 180 can sign messages using its private key 182 and any of the SPUs 120 can verify the signature using the CMS public key stored in portion 136 of memory 130.

Storage services implemented in platform 100 include execution of IO requests such as reads and writes and management requests such as creating a new volume 122. A read or write may identify a storage location by a volume number or volume ID of a virtual volume 122 and an offset to a starting location of data in the identified virtual volume 122. A client 162 may send a request to an SPU 120 or a server 110. A remote client 172 or cloud management service 180 may similarly send instructions, but authentication of remote client 172 or cloud management service 180 may be required before any storage services are provided or management operations are locally performed.

Figure 2:
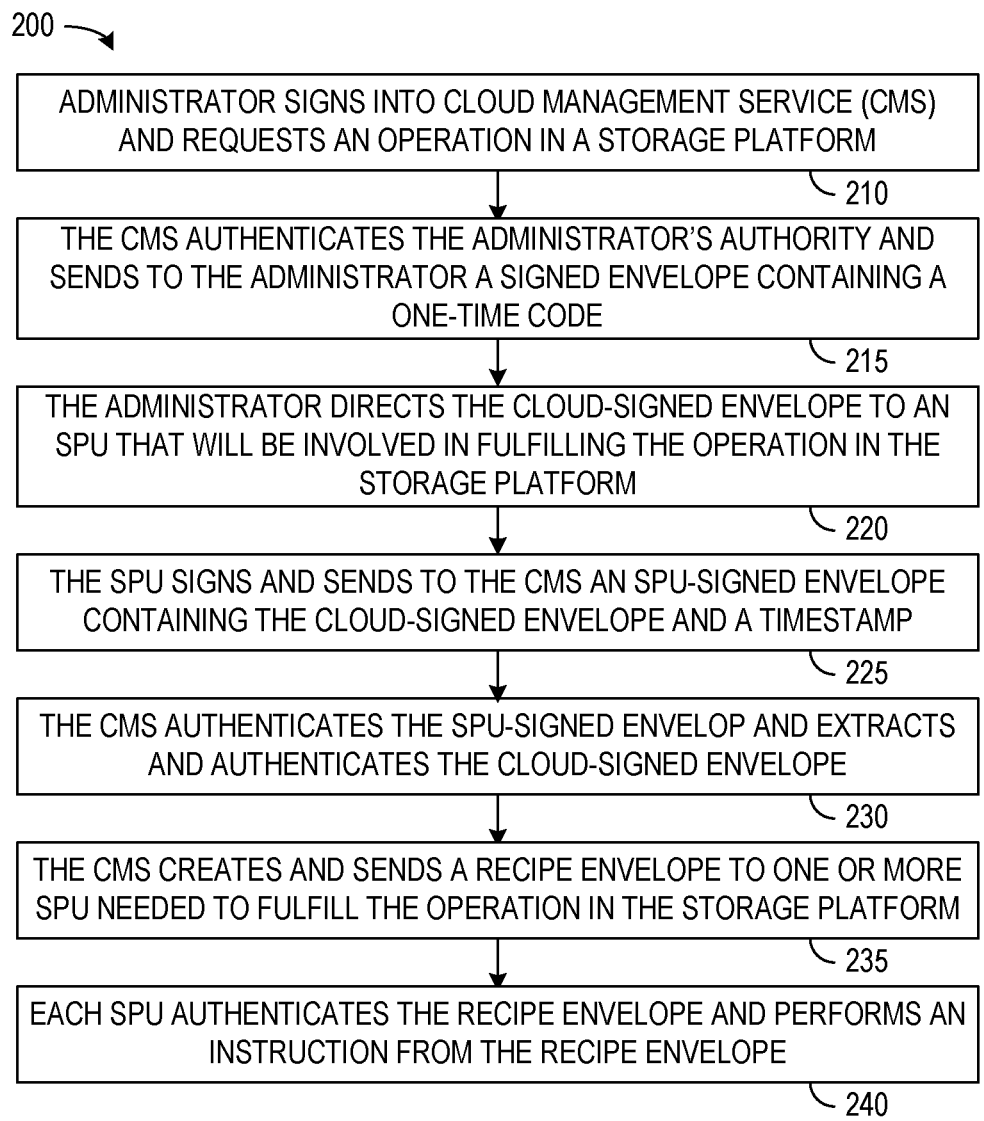
FIG. 2 is a flow diagram of a multi-factor instructions authentication process in accordance with an example of the present disclosure.

FIG. 2 is a flow diagram of process 200 for providing authenticated instructions from a CMS to a data plane on a private network. In a block 210, an administrator may use a browser or other agent to contact the CMS and provide credentials. The CMS is a remote service, e.g., CMS 180 of FIG. 1, that is outside of the private network of the storage platform that the administrator seeks to change. By logging in to the CMS, the administrator may provide credentials including a user name and a password as a first factor for authentication of the administrator.

The CMS, in a process block 215, uses the credentials to authenticate the administrator and determine whether the administrator has the authority required for performance of the operation. If not, process 200 ends. If the administrator is authenticated and has the required authority, the CMS creates a message or envelope containing a command and a random one-time code. The command represents the requested operation, and the one-time code may be randomly generated and different from any prior one-time codes that the CMS has recorded as recently used. The CMS cryptographically signs the envelope with private key of the CMS and sends the envelope, sometimes referred to herein as the inner cloud-signed envelope, to the browser or other agent of the administrator.

The administrator's browser, in a process block 220, passes the inner cloud-signed envelope to a component of the storage platform that is in the private domain. The component may particularly be a representative SPU that may later be involved in fulfilling the requested operation.

In a process block 225, the representative SPU or other storage platform component receives the inner cloud-signed envelope from the administrator and may verify the signature on the inner cloud-signed envelope using the public key of the CMS. If the inner cloud-signed envelope is authenticated, the SPU creates a message or envelope containing the inner cloud-signed envelope and a timestamp of the current time when the message or envelope was created. The SPU or other storage component then uses its own private key to cryptographically sign the new message or envelope, which sometimes referred to herein as the SPU-signed envelope, and the SPU-signed envelope is sent to the CMS.

The CMS in a process block 230 uses the public key of the representative SPU or other storage platform component to authenticate the SPU-signed envelope was properly signed. The CMS also extracts the inner cloud-signed envelope from within the SPU-signed envelope and verifies the signature on the inner cloud-signed envelope using the public key of the CMS, ensuring that the inner cloud-signed envelope has not been modified. The CMS thus validates the administrator and the operation using two factor, a signature from an SPU or other storage component within the private domain of the storage platform and the prior authentication of the credentials received from when the administrator logging into the CMS. If the multifactor authentication fails, process 200 ends. If multifactor authentication succeeds, the CMS produces a recipe for each SPU that will be involved in fulfilling the requested operation.

The CMS, after the successful multifactor authentication, performs a process block 235, which creates one or more message or envelope, sometime referred to herein as the recipe envelope(s), which contains the SPU-signed envelope and the instructions for the SPUs that are to implement the operation. The CMS cryptographically signs the recipe envelope or envelopes using the private key of the CMS and sends the recipe envelope each SPU needed to compete the operation.

Each SPU receiving a recipe envelope performs a process block 240 including using the public key of the CMS to verify that the CMS signed the recipe envelope. The SPU then extracts the SPU-signed envelope, uses the public key of the representative SPU or other component of the storage platform to authenticate the signature on the SPU-signed envelope, and checks that the time stamp from the SPU-signed envelope is sufficiently recent, e.g., differs from the current time by less than a maximum delay. The SPU also extracts the inner cloud-signed envelope from the SPU-signed envelope and verifies that the CMS also signed there. The SPU may further compare the one-time code from the inner cloud-signed envelope against a stored list of recent one-time codes the SPU has seen to verify the same one-time code has not been recently used. If all the conditions are verified, the SPU executes the instruction from the recipe envelope to implement the administrator-requested operation.

Enterprises must have faith that only they can access, modify, or destroy their data. Providing security mechanisms that limit those operations to legitimate administrators is essential for data security. Multi-factor authentication as disclosed here increases security and the faith that an enterprise may have in its storage system.

All or portions of some of the above-described systems and methods can be implemented in a computer-readable media, e.g., a non-transient media, such as an optical or magnetic disk, a memory card, or other solid state storage containing instructions that a computing device can execute to perform specific processes that are described herein. Such media may further be or be contained in a server or other device connected to a network such as the Internet that provides for the downloading of data and executable instructions.

Although particular implementations have been disclosed, these implementations are only examples and should not be taken as limitations. Various adaptations and combinations of features of the implementations disclosed are within the scope of the following claims.

What is claimed is:

1. A process comprising:
receiving, from an administrator, and by a management system, credentials and a request to implement an operation on a storage platform comprising a plurality of services processing units (SPUs) within a private network, the management system being outside of the private network;
verifying, by the management system, the credentials of the administrator;
sending, by the management system, a first message to the administrator, the first message signed by the management system using a private key of the management system, the first message including a command for the request to implement the operation;
causing the first message to be forwarded to an identified first SPU of the plurality of SPUs within the private network to fulfill the operation;
receiving, by the management system, a second message from the first SPU, the second message containing the first message;
verifying, by the management system, that the first SPU signed the second message and that the second message contains the first message; and
in response to the verification succeeding, sending, to the first SPU, a third message, signed by the management system using the private key of the management system, containing an instruction and the second message.

2. The process of claim 1, wherein the first message is sent through a public network to the private network.

3. The process of claim 2, wherein the public network comprises the Internet.

4. The process of claim 1, further comprising:
constructing the instruction for the identified first SPU.

5. The process of claim 4, further comprising:
implementing the instruction in response to a validation process succeeding, the validation process comprising:
validating that the management system signed the third message;
extracting the second message from the third message; and
validating that the first SPU signed the second message.

6. The process of claim 5, wherein:
the first message contains a one-time code; and
the validation process further comprises extracting the first message from the extracted second message and verifying that the one-time code differs from prior one-time codes associated with operations the storage platform completed.

7. The process of claim 5, wherein:
the second message contains a time stamp; and
the validation process further comprises verifying that the time stamp corresponds to a time that differs from a current time by less than a threshold time difference.

8. The process of claim 1, wherein the storage platform is instructed to perform the operation only if the second message is verified to contain the first message signed by the management system.

9. At least one processor comprising:
one or more processing units configured to:
receive, from an administrator, and by a management system, credentials and a request to implement an operation on a storage platform comprising a plurality of services processing units (SPUs) within a private network, the management system being outside of the private network;
verify, by the management system, the credentials of the administrator;
send, by the management system, a first message to the administrator, the first message signed by the management system using a private key of the management system, the first message including a command for the request to implement the operation;
cause the first message to be forwarded to an identified first SPU of the plurality of SPUs within the private network to fulfill the operation;

receive, by the management system, a second message from the first SPU, the second message containing the first message;

verify, by the management system, that the first SPU signed the second message and that the second message contains the first message; and in response to the verification succeeding, send, to the first SPU, a third message, signed by the management system using the private key of the management system, containing an instruction and the second message.

10. The at least one processor of claim 9, wherein the first message is sent through a public network to the private network.

11. The at least one processor of claim 10, wherein the public network comprises the Internet.

12. The at least one processor of claim 9, wherein the one or more processing units are further configured to:
construct the instruction for the identified first SPU.

13. The at least one processor of claim 12, wherein the one or more processing units are further configured to:
implement the instruction in response to a validation process succeeding, the validation process comprising:
validating that the management system signed the third message;
extracting the second message from the third message; and validating that the first SPU signed the second message.

14. The at least one processor of claim 13, wherein:
the first message contains a one-time code; and
the validation process further comprises extracting the first message from the extracted second message and verifying that the one-time code differs from prior one-time codes associated with operations the storage platform completed.

15. The at least one processor of claim 13, wherein:
the second message contains a time stamp; and
the validation process further comprises verifying that the time stamp corresponds to a time that differs from a current time by less than a threshold time difference.

16. The at least one processor of claim 9, wherein the storage platform is instructed to perform the operation only if the second message is verified to contain the first message signed by the management system.

17. A system comprising:
at least one processor; and
a memory coupled to the at least one processor, the memory storing instructions that, when executed by the at least one processor, cause the system to perform steps comprising:
receiving, from an administrator, and by a management system, credentials and a request to implement an operation on a storage platform comprising a plurality of services processing units (SPUs) within a private network, the management system being outside of the private network;
verifying, by the management system, the credentials of the administrator;
sending, by the management system, a first message to the administrator, the first message signed by the management system using a private key of the management system, the first message including a command for the request to implement the operation;
causing the first message to be forwarded to an identified first SPU of the plurality of SPUs within the private network to fulfill the operation;
receiving, by the management system, a second message from the first SPU, the second message containing the first message;
verifying, by the management system, that the first SPU signed the second message and that the second message contains the first message; and
in response to the verification succeeding, sending, to the first SPU, a third message, signed by the management system using the private key of the management system, containing an instruction and the second message.

18. The system of claim 17, wherein the first message is sent through a public network to the private network.

19. The system of claim 18, wherein the public network comprises the Internet.

20. The system of claim 17, wherein the memory storing instructions that, when executed by the at least one processor, further cause the system to perform steps comprising:
constructing the instruction for the identified first SPU.

* * * * *